R. B. HARTSOUGH.
PILOT ATTACHMENT FOR TRACTION ENGINES.
APPLICATION FILED FEB. 23, 1909. RENEWED OCT. 28, 1909.
1,138,590. Patented May 4, 1915.
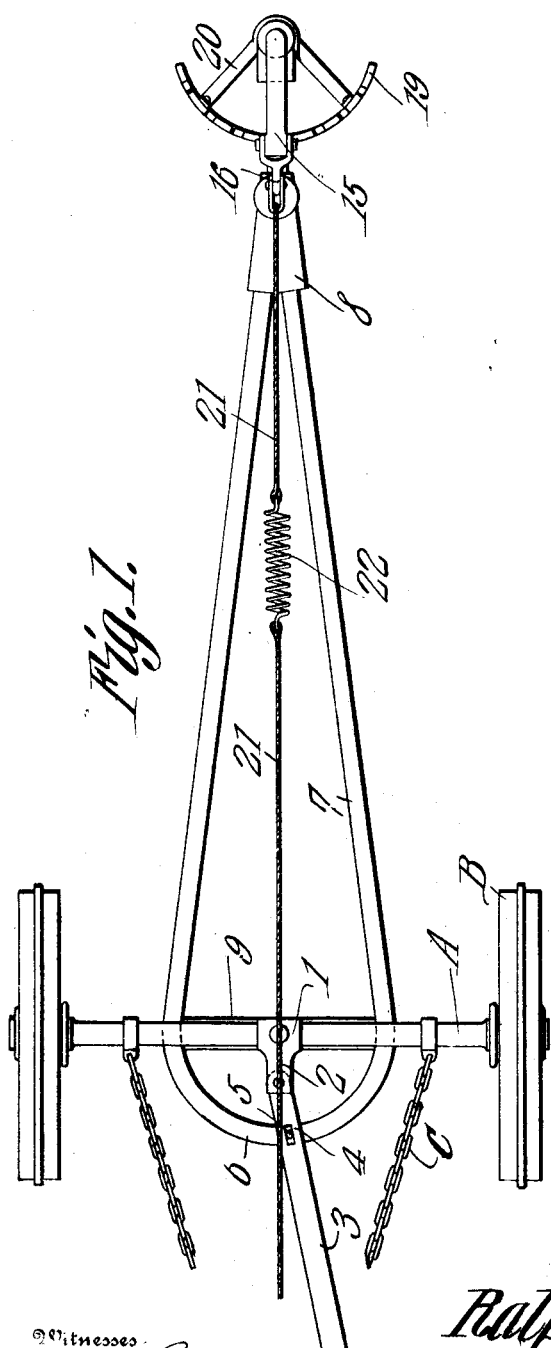
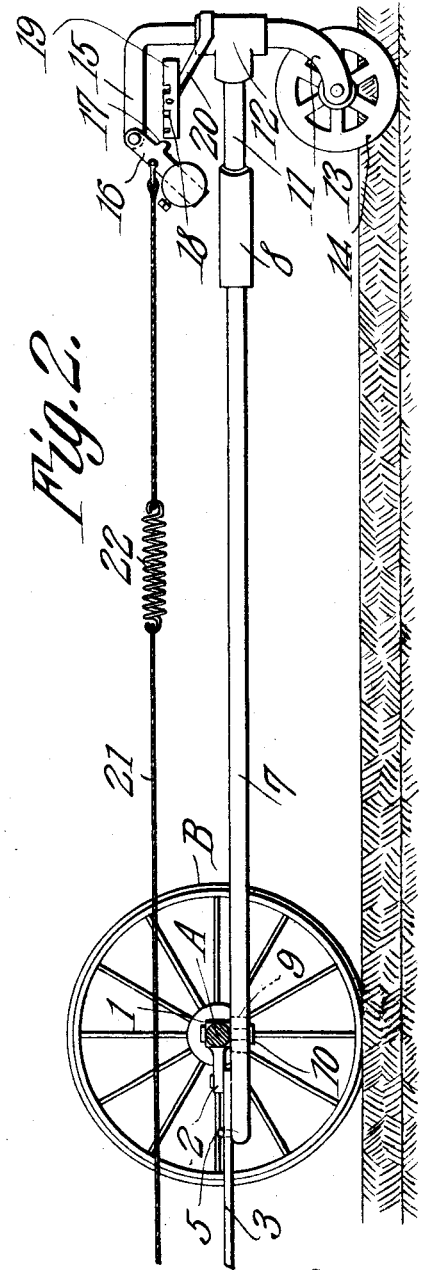
Inventor
Ralph B. Hartsough.

UNITED STATES PATENT OFFICE.

RALPH B. HARTSOUGH, OF MINNEAPOLIS, MINNESOTA.

PILOT ATTACHMENT FOR TRACTION-ENGINES.

1,138,590.      Specification of Letters Patent.      Patented May 4, 1915.

Application filed February 23, 1909, Serial No. 479,344. Renewed October 28, 1909. Serial No. 525,156.

*To all whom it may concern:*

Be it known that I, RALPH B. HARTSOUGH, a citizen of the United States, residing at Minneapolis, in the county of Hennepin and State of Minnesota, have invented a new and useful Pilot Attachment for Traction-Engines, of which the following is a specification.

This invention relates to piloting attachments for agricultural machinery and more particularly for traction engines such as utilized for drawing gangs of plows.

The principal object of the invention is to provide a device of this character designed for use as an attachment which can be applied to traction engines of different types and which, when not in use as a piloting device, is capable of swinging or traveling freely over the ground while in fixed relation to the axle of the steering wheels, the traction engine being steered in the usual manner through chains connected to the front axle.

A further object is to provide a piloting device having simple means whereby the wheel of said device may be locked at a predetermined angle to the frame of the attachment, said means being under the control of an occupant of the traction engine.

A still further object is to provide means whereby the angle of the attachment to the axle of the engine may be changed at will to permit the engine to travel nearer the furrow in which the pilot wheel is located when, for example, the machine is traveling over an inclined surface where the gang of plows tends to shift laterally out of the line.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a plan view of the steering wheels and axle of a traction engine and showing applied thereto the piloting attachment constituting the present invention. Fig. 2 is a side elevation of the mechanism shown in Fig. 1.

Referring to the figures by characters of reference A designates the front or steering axle of a traction engine, the same being carried by wheels B and having the usual steering chains C connected to the axle.

The attachment constituting the present invention consists of a suitable sleeve or bracket 1 secured to the middle portion of the axle A and having a rearwardly extending bracket 2 to which is pivotally connected an adjusting lever 3. This lever may be locked in adjusted position by means of any suitable mechanism (not shown) and a longitudinal slot 4 is formed in the lever and receives a stud 5 upstanding from the middle of the intermediate or bowed portion 6 of the frame of the attachment. Converging arms 7 extend forwardly from the ends of this bowed portion, the front ends of the arms being held together in any suitable manner as by means of a casting 8. The frame has a transverse bar 9 connecting opposite sides thereof adjacent the bowed portion 6 and this cross-bar receives the pivot bolt or stud 10 extending downwardly from the sleeve 1. It will be seen therefore that the entire frame of the attachment is capable of swinging laterally with relation to the axle A, the part 10 constituting the pivot of the frame and the lever 3, by reason of its engagement with the stud 5, constituting means whereby the entire frame may be readily shifted laterally independently of the axle.

An arm 11 extends forward from the casting 8 and has a head 12 at its forward end constituting a bearing for the upstanding stem 13 of a caster 14. This stem extends through the head and is provided at its upper end with an arm 15 projecting rearwardly therefrom. A weighted latch 16 is pivotally connected to the free end of the arm and is provided with a tooth 17 designed to be seated in any one of the series of notches 18 formed within an arcuate holding strip 19. Said strip is attached to the head 12 by means of downwardly converging arms 20.

A latch-actuating cord 21 is connected to the latch 16 and extends backwardly to the engine and at a point within convenient reach of the operator, said cord being preferably formed of two sections between which a coiled spring 22 is interposed, both of the sections being attached to this spring as clearly indicated in the drawings.

In using the device herein described the frame 7 of the attachment is first adjusted to a desired angle with relation to axle A, this adjustment being effected by means of the lever 3. This will bring the front end of the attachment to one side of the longitudinal center of the machine, and the caster 14 can be disposed so as to travel within the adjoining furrow, said caster being locked in relation to the frame 7 by placing the tooth 17 of latch 16 in one of the notches 18. The traction engine will thus be properly piloted during its forward movement and the plows drawn thereby will be maintained at the desired distance from the furrow previously cut. When the machine reaches the end of the furrow and it is desired to turn, said machine is steered in the usual manner by drawing on one or the other of the chains C. Before this is done however the operator pulls the cord 21 longitudinally so as to disengage the tooth 17 from the notched strip 19. The caster 14 thus acts as an idler, and while the machine is being turned the frame 7 swings around after the manner of a sweep and the caster moves freely over the ground until the machine is brought into proper position at the head of the line of furrows to be cut. The parts can then be readily reset in the manner hereinbefore described.

By providing the spring 22 there is no danger of breaking the cord while the caster is turning about its vertical axis, because this spring permits the connection between the latch 16 and the traction engine to elongate whenever necessary.

Importance is attached to the fact that the caster 14 does not constitute a steering wheel but is utilized merely as a pilot for aiding the operator in preserving the proper distance between the cut furrows and the traction engine. At all other times this caster constitutes nothing more than an idler.

In using a traction engine with this device applied thereto, the furrow wheel is brought into the furrow and against the wall of the furrow on the side toward the unplowed land. The traction engine is brought into position with its wheels in the proper relation to the furrow so that the plows drawn by the engine will be in proper relation to the previously plowed ground. The horizontal swinging frame and the vertical axle of the pilot wheel are locked in the proper relation to each other and to the engine, and the pilot wheel will then hug the wall of the furrow and will automatically steer the engine across the land to be plowed, for the full length of the furrow. When the end of the furrow is reached the pilot wheel is released and it then becomes an ordinary freely swinging caster wheel, and in turning the engine the ordinary steering means may be employed, and the freely swinging pilot wheel will not interfere with the operation of the regular steering apparatus of the traction engine. This is due to the fact that the present device has a caster wheel which is capable of swinging freely upon its vertical axis when not in use as a piloting device and which does not, therefore, interfere with the free movement of the frame of the attachment when the front or steering axle of the traction engine is turned.

Obviously various changes may be made in the construction and arrangement of the parts without departing from the spirit or sacrificing the advantages of the invention.

What is claimed is:—

1. In combination, a traction engine, a frame supported thereon and projecting in front of the engine, a furrow pilot wheel carried by said frame and adapted to bear on the side wall of the furrow, means located near said wheel and having an operating means extending back to the engine for locking said wheel at a predetermined angle, said wheel being freely movable as a caster when released from said locking means.

2. In combination, a traction engine, a frame projecting in advance of said engine, a furrow pilot wheel carried by said frame and arranged to oscillate on a vertical axis, means located near said wheel for locking it at a predetermined angle with respect to the wall of the furrow, means extending back to the engine for operating said locking means, said wheel being freely movable as a caster when released from said locking means.

3. In combination, a traction engine, a frame mounted thereon and projecting forwardly therefrom, a furrow pilot wheel carried by said frame and arranged to bear on the side wall of the furrow, a locking latch arranged to lock said wheel at a predetermined angle to the furrow wall, and means extending backwardly to the engine for operating said latch.

4. The combination, with the steering axle of a traction engine, of a forwardly projecting frame, a caster carried by said frame, and means located at the forward portion of said frame and operable from said engine for locking said caster against movement with respect to the frame, said caster when locked constituting a pilot wheel.

5. The combination, with the steering axle of a traction engine, of a frame projecting forwardly therefrom, a pilot wheel journaled in said frame and arranged to bear on the side wall of the furrow, said wheel having a substantially vertical axis and capable of performing the functions of a caster wheel, means for locking said caster wheel at any desired angle with respect to the furrow wall, and means controlling said locking means from the engine, for the purpose specified.

6. The combination, with a steering axle of a traction engine, of a frame projecting forwardly therefrom, a caster connected to said frame, said caster including a stem journaled in said frame and extending perpendicularly to the plane thereof, an arm extending from said stem, a locking strip carried by said frame, a latch carried by said arm and normally engaging said strip to hold the caster against movement, said caster when locked constituting a pilot wheel, and means for actuating said latch to release said caster.

7. The combination, with the steering axle of a traction engine, of a forwardly projecting frame, a pilot wheel, means carried by the forward portion of said frame for locking said pilot wheel at a predetermined angle to said frame, and means for releasing said locking means.

8. The combination, with a steering axle of a traction engine, of a frame projecting forwardly therefrom, a caster having a vertically arranged stem journaled in said frame, an arm projecting from said stem, means for locking said stem against rotation, said caster when locked constituting a pilot wheel, and means for releasing said locking mechanism.

9. The combination, with a plow motor, of a guide wheel carrier arranged at the front thereof, a vertical axis journaled thereon, a yoke extending downwardly from said axis, a vertically arranged guide wheel mounted in the yoke and adapted to bear against the land-side of a furrow, a locking device for preventing the axis from turning, and means for releasing the locking device.

In testimony that I claim the foregoing as my own, I have hereto affixed my signature in the presence of two witnesses.

RALPH B. HARTSOUGH.

Witnesses:
R. J. LYONS,
CHARLES T. THOMPSON.